United States Patent Office 3,390,132
Patented June 25, 1968

3,390,132
POLYESTER RESINS
John F. Walker, Wilmington, Del., assignor to Hercules, Incorporated, a corporation of Delaware
No Drawing. Filed May 27, 1964, Ser. No. 370,698
2 Claims. (Cl. 260—75)

This invention relates to the chemical art and particularly to the polyester resin art.

More particularly, this invention relates to novel linear, thermoplastic polyester resins comprised of critical proportions of specific polyester-forming compounds.

This invention relates also to high strength members comprised of the novel polyester resins.

For a complete understanding of this invention, reference is made to the following detailed description.

In accordance with this invention there are provided novel linear, thermoplastic polyester resins that are derived from a glycol, a critical proportion of terephthalic acid or an ester-forming derivative thereof, and a critical proportion of hexahydroterephthalic acid or an ester-forming derivative thereof.

It is characteristic of the polyester resins of this invention that they can exist either in a metastable amorphous state or in a stable crystalline state, depending on processing conditions. The amorphous state is characterized by a relatively low softening point of from about 63° C. to 70° C., and the crystalline state by a relatively high melting point of from about 162° C. to 201° C. Conversion from the amorphous state to the crystalline state is accomplished by conveniently controllable heat treatment.

A polyester resin of this invention can be easily and readily applied and/or procsesed in the amorphous state at relatively low temperatures. Subsequently, the resin can be heat treated, which heat treatment can be conveniently accomplished during fabrication of a shaped member comprised thereof, to crystallize the resin, whereby there is provided a member having excellent physical properties and heat-resistant properties.

The polyester resins of this invention are derived by reacting, under polyester-forming conditions well known in the art, a glycol, such as ethylene glycol, terephthalic acid, and hexahydroterephthalic acid.

The relative amounts of terephthalic acid and hexahydroterephthalic acid to be used are critical for the purposes of this invention. It is necessary that the hexahydroterephthalic acid comprise at least about 25 mole percent and not more than about 40 mole percent of the total acid component of the final polymer. The balance of the acid component of the final polymer, from 75 to 60 mole percent, will be the terephthalic acid. The acids will be present in the final polymer in the same ratio as they were present in the initial reactants provided an excess of glycol is used. Thus, the amount of glycol used in the initial reaction mixture will be in excess of one mole, and preferably from about 1.8 to 2.2 moles, per mole of acid component, the acid component consisting of from 25 to 40 mole percent of hexahydroterephthalic acid and from 75 to 60 mole percent of terephthalic acid. It is to be understood that the ester-forming derivatives of these acids can be used in place of, and are the full equivalents of, the above acids as is generally the case in the manufacture of linear polyesters.

The polyester resins of this invention can be employed, and preferably are employed, in the fabrication of high strength, high heat resistant members. The fact that their good physical properties and heat resistant properties can be developed during a molding cycle make them particularly suitable as molding resins. This aspect of the invention will be more apparent from a consideration of the examples that follow. Resins derived from less than about 25 mole percent of hexahydroterephthalic acid and more than about 40 mole percent of hexahydroterephthalic acid do not possess the highly satisfactory fabrication properties of the resins of this invention. Those polyester resins comprised of less than about 25 mole percent of hexahydroterephthalic acid crystallize too readily and those comprised of more than about 40 mole percent of hexahydroterephthalic acid crystallize too slowly to be of any practical use in the fabrication of high strength, high heat resistant members.

In preparing the polyester resins of this invention, it is preferred to use the lower dialkyl esters of the above acids as the initial reactants such, for example, as dimethyl terephthalate, dimethylhexahydroterephthalate, diethylterephthalate, and diethylhexahydroterephthalate. Thus, an ester interchange reaction between the glycol and the dialkyl esters of the acids is carried out, preferably in the presence of a suitable catalyst, and the alcohol reaction product is distilled out of the reaction mixture, thereby forming the corresponding glycol phthalates. Subsequently, the product of the ester interchange is heated at elevated temperatures and at reduced pressures to produce a high molecular weight polymer having a specific viscosity of at least about 0.4, and preferably at least about 0.75, as measured at 25° C. on a 1% solution of the polyester resin in a 60:40 mixture by weight of phenol and tetrachloroethane. Thus, when ethylene glycol is employed as the glycol reactant, the products are composed of linear molecules of high average molecular weight in which two kinds of repeating units, ethylene terephthalate and ethylene hexahydroterephthalate, are distributed at random along the polymer chain, from 25 to 40 mole percent of the units being ethylene hexahydroterephthalate units and from 75 to 60 mole percent of the units being ethylene terephthalate units.

The polyester resins of this invention can be, and preferably are, derived by the ester interchange and polymerization process disclosed and described in U.S. Patent 3,057,828, reference to which is hereby made. Using this method, the ester interchange reaction is carried out by heating the glycol with a mixture of dimethylhexahydroterephthalate and dimethylterephthalate in the presence of a catalyst such as cadmium antimonite, tin antimonite, lead antimonite, magnesium antimonite, manganese antimonite, and mixtures thereof. The resulting glycol terephthalate-glycol hexahydroterephthalate is polymerized by splitting off glycol under reduced pressure at elevated temperature in the presence of the catalyst used in the ester interchange reaction.

Glycols that can be used in preparing the polyester resins of this invention include the glycols having the formula $HO(CH_2)_nOH$ wherein $n$ is a whole number of from 2 through 10 such, for example, as 1,2-ethanediol, 1,3-propane diol, 1,4-butanediol, 1,6-hexanediol, 1,8-octanediol, and 1,10-decanediol. Other glycols that can be employed include neopentyl glycol and 1,4-cyclohexanedimethanol. Mixtures of two or more glycols can be employed if desired.

The following examples, summarized in Table I, are illustrative of the preparation of the polyester resins of this invention. All parts are by weight unless otherwise specified. In the examples, DMHHT is used to designate dimethyl hexahydroterephthalate, DMT is used to designate dimethyl terephthalate, and EG is used to designate ethylene glycol.

The polyester resins of the examples were prepared by polymerizing, under melt polymerization conditions, the reactants in the amounts set forth in Table I. The reactants, in the amounts indicated in Table I, were placed in a reaction vessel equipped with a heater, a motor-driven stirrer, and a still head. The resulting mixture was melted and then, with constant agitation, heated at temperatures, programmed upward from 180° C. to 230° C. over a period of time (from about 9 to 12 hours) required to remove substantially all the methanol reaction product from the reaction vessel. The prepolymer thus formed was transferred to a stainless steel autoclave equipped with heater, motor-driven stirrer, and vacuum line, and then pre-heated to a temperature of about 150° C. A 30 millimeters of mercury vacuum was established, and, with constant agitation, the prepolymer was heated for 3 hours at temperatures programmed upward from 150° C. to 285° C. under pressures programmed downward from 30 millimeters of mercury to 1 millimeter of mercury. After reaching the temperature of 285° C., the reaction mass was maintained at this temperature for about 1¾ hours, during which time the pressure was reduced from 1 millimeter of mercury to 0.5 millimeter of mercury. The molten polyester resin thus formed was discharged from the autoclave through a water quench, chopped into relatively small segments, dried for 16 hours at 60° C. in vacuum, and then packaged hermetically. The polyester resin thus prepared was in the amorphous state.

TABLE I

| Example No. | 1 | 2 | 3 | 4 | 5 |
|---|---|---|---|---|---|
| Reactants: | | | | | |
| DMHHT, parts | [1] 450 | [2] 540 | [3] 630 | [4] 720 | [5] 810 |
| DMT, parts | [6] 1,309.5 | [7] 1,222.2 | [8] 1,134.9 | [9] 1,047.6 | [10] 960.3 |
| EG, parts | 1,004.4 | 1,004.4 | 1,004.4 | 1,004.4 | 1,004.4 |
| Catalyst, Pb(SbO$_2$)$_2$, part | .261 | .261 | .261 | .261 | .261 |
| Product yield, parts | 1,672 | 1,710 | 1,728 | 1,720 | 1,720 |
| Specific Viscosity | 0.78 | 0.56 | 0.82 | 0.52 | 0.56 |
| Amorphous softening point, ° C | 70 | 66 | 64 | 63 | 62 |
| Crystalline melting point, ° C | 201 | 194 | 177 | 162 | 143 |
| 2d Order Transition Temp., ° C | 53 | 49 | 48 | 44 | 42 |
| Hardness, Rockwell R-15 | 108 | 104 | 106 | 102 | 99 |
| 10,000 cps. Melt Visc. Temp., ° C | 240 | 225 | 210 | 180 | 160 |

[1] 25 mole percent. [6] 75 mole percent.
[2] 30 mole percent. [7] 70 mole percent.
[3] 35 mole percent. [8] 65 mole percent.
[4] 40 mole percent. [9] 60 mole percent.
[5] 45 mole percent. [10] 55 mole percent.

The crystallization behavior of the polyester resins of the examples is shown by the data set forth in Table II below. The data were obtained by the following procedure. Film strips, 0.25 inch by 3 mils by 12 inches, were prepared from crystallizable polyester resins of the examples. These film strips were laid on a special hot plate having a controlled, continuous temperature profile of 60° C. to 260° C., that is, the hot plate temperatures, which remained substantially constant for a given zone and differed from zone to zone, progressed from 60° C. at one end of the hot plate to 260° C. at the other end. All film strips were initially in the amorphous (transparent) condition. Crystal growth, as evidenced by a change of transparency in the film to a cloudy or translucent state, was observed for each film. Crystal growth of a particular polyester resin is denoted by the increasing breadth of the cloudy or translucent area in terms of its progressive upper and lower temperature limits.

Referring to Table II, the fastest annealing temperature is indicated as the mid-temperature of the crystal formation at its earliest incidence, and the crystalline melting point by the ultimate upper temperature limit of crystal formation. In Table II, NVCF is used to designate "no visible crystal formation." Thus, for example, in the polyester of Example 1, visible crystal formation occurred after 5 minutes, and the temperature limits defining the visible crystal zone were 140° C. and 145° C. From a consideration of these data, it will be apparent to those skilled in the art that the resins of this invention can be employed as molding resins for most molding cycles to produce high strength, heat resistant molded members. It is to be noted that the resin of Example 5, which is comprised of 45 mole percent of ethylene hexahydroterephthalate units, crystallizes too slowly to be of any practical utility as a fabricating resin to produce, conveniently and economically, high strength, heat resistant members. Furthermore, the resin of Example 5, after prolonged heat treatment to crystallize the resin does not have the good physical properties of the resins of this invention nor does it have the heat resistant properties of the resins of this invention as evidenced by the data shown in Table III below.

TABLE II.—CRYSTAL GROWTH OF CRYSTALLIZABLE POLYESTERS OF TABLE I

| Time | Polyester of— | | | | |
|---|---|---|---|---|---|
| | Example 1 | Example 2 | Example 3 | Example 4 | Example 5 |
| | Temperature Zone of Crystal Formation, ° C. | | | | |
| Start | NVCF | NVCF | NVCF | NVCF | NVCF |
| 2 minutes | NVCF | 139–148 | NVCF | NVCF | NVCF |
| 5 minutes | 140–145 | 126–160 | 130–134 | 115–121 | NVCF |
| 10 minutes | 132–155 | 109–169 | 121–148 | 96–137 | NVCF |
| 15 minutes | 121–175 | 97–176 | 113–155 | 92–144 | NVCF |
| 20 minutes | 113–184 | 95–182 | 108–160 | 90–150 | 110–124 |
| 30 minutes | 106–190 | 90–190 | 105–163 | 86–155 | 104–131 |
| 60 minutes | 98–195 | 88–194 | 94–170 | 83–159 | 97–133 |
| 2 hours | 95–206 | 87–197 | 90–187 | 79–160 | 91–134 |
| 4 hours | 92–207 | 82–201 | 85–190 | 73–162 | 86–143 |

An indication of the practical advantage of crystallinity of the polyester resins of this invention is shown by the data set forth in Table III below. Two sets of film strips of the polyester resins of the indicated examples, 0.5 inch by 3 mils by 3 inches, were hung in a circulating air oven under 20 grams, i.e., 25 p.s.i., dead weight tensile loads. One set of the film strips was in the amorphous state, and the other set was in the crystalline state as a result of heat treatment of amorphous film strips for 30 minutes at 125° C. The oven temperature, which initially was 25° C., was programmed upward at the rate of 2° per minute, and the temperature at which each film specimen failed was noted. The film specimen was considered to have failed when it would no longer support the weight attached thereto as evidenced by substantial elongation of the film specimen. This is referred to as the "zero strength temperature." Referring to Table III, the zero strength temperature of the amorphous polyester resins indicates the temperature at which the amorphous polyester resin starts to soften and which is the minimum feasible temperature at which the polyester resins can be employed in processing. It will be noted from Table III that the zero strength temperature of the heat treated strips of polyester resins is substantially above that of their nonheat treated counterparts. These data of this table show the high heat resistant properties that can be obtained in members comprised of the polyester resins of this invention.

TABLE III
[Zero Strength Temperatures, °C.]

| Polyester Resin of— | Not Heat Treated (Amorphous) | Heat Treated (Crystalline) |
| --- | --- | --- |
| Example 1 | 68 | 183 |
| Example 2 | 66 | 173 |
| Example 3 | 64 | 162 |
| Example 4 | 63 | 135 |
| Example 5 | 62 | 105 |

The examples that follow illustrate the utility of the polyester resins of this invention and the outstanding physical properties of members prepared therefrom.

Example 6

The polyester resin of Example 1 was compression molded into a plurality of sheets, and the sheets were cooled sufficiently fast so that the polyester resin was in its amorphous state. Twelve sheets of woven glass fabric were alternately sandwiched between thirteen of the polyester sheets. The resulting sandwich was compression molded for about 15 minutes at a temperature of about 150° C. and under a pressure of 50 p.s.i. to provide a heat treated, ⅛-inch thick, flat, laminated sheet comprised of, by weight, 40% of the polyester resin and 60% glass fabric. The sheet was then subjected to certain tests, and the results of these tests are set forth in Table IV below. It will be apparent to those skilled in the art that these test results show the product of this example to be suitable for use as a high-endurance material of construction such as an automotive body panel, or as a boat hull.

TABLE IV.—PHYSICAL PROPERTIES OF GLASS FABRIC-REINFORCED POLYESTER RESIN OF EXAMPLE 6

| | |
| --- | --- |
| Tensile strength, 25° C., p.s.i. (ASTM D638) | 38,900 |
| Tensile modulus, 25° C., p.s.i. (ASTM D638) | 2,832,000 |
| Tensile elongation, 25° C., percent (ASTM D638) | 1.8 |
| Flexural strength, 25° C., p.s.i. (ASTM D790) | 56,500 |
| Flexural modulus, 25° C., p.s.i. (ASTM D790) | 3,110,000 |
| Flexural strength, 100° C., p.s.i. (ASTM D790) | 12,600 |
| Flexural modulus, 100° C., p.s.i. (ASTM D790) | 1,500,000 |
| Creep strain, 25° C., 1000 hours (ASTM D790) at 25% of flex strength load, in./in. | 0.0013 |
| Creep strain, 100° C., 1000 hours at 25% of flex strength load, in./in. | 0.0007 |
| Heat deflection temp., 264 p.s.i. °C. (ASTM D648) | 193 |
| Impact, Charpy, 25° C., ft.-lb./in. (ASTM D256) | 33 |

Example 7

A laminated sheet was prepared exactly as detailed in Example 6 except that it was quenched in water after a 2-minute compression-mold cycle to produce a substantially transparent sheet, the polyester resin component of which is in its amorphous state. Advantage was taken of the data of Table II in scheduling this molding cycle. Thus, since the polyester employed in this example was the Example 1 polyester, it was determined that this molding cycle could be of at least a 2-minute duration before any crystallization would occur. The data of Table I show that the second order transition temperature of this resin is 53° C. Hence, this prepared sheet can be stored for prolonged periods of time at room temperature and up to about 53° C. if required prior to thermoforming or heat treatment. The laminated sheet was placed in a cup-shaped matched mold preheated to a temperature of about 150° C., and compression molded for 10 minutes at this temperature under a pressure of about 5 p.s.i. The product was a cup-shaped member of substantially uniform wall thickness reflecting, to a substantial degree, the contours of the mold. The molded member had high physical properties and good heat resistant properties. This example illustrates that a prefabricated sheet comprised of the polyester resin of this invention in its amorphous state can be readily and easily thermoformed to provide members having good heat resistance and outstanding strength properties.

It will be apparent from the above description and examples that the polyester resins of this invention have utility in the amorphous state and in the crystalline state. The resins can be prepared in the amorphous state and stored for prolonged periods of time at room temperature conditions and higher, if required, prior to use; and shipment of the resins to a fabricator presents no problems. Sheets and other shaped members comprised of the amorphous polyester resin of this invention can be heat treated to crystallize the resin whereby the properties thereof are improved substantially.

Fabric, woven and non-woven, comprised of glass fibers, synthetic resin fibers, natural fibers such as cotton, wool, asbestos and the like can be impregnated, coated, or otherwise treated with the resins of this invention. Application of the resin can be made from a hot melt thereof, from a solution thereof in a suitable solvent or from an aqueous dispersion thereof. The resin can be applied in the finely divided dry form if desired. An amorphous resin sheet or film can first be prepared and employed in a manner similar to that disclosed in Examples 6 and 7. After application of the resin, the resin treated member can be fabricated into a high strength, heat resistant member of desired configuration by the application of heat and pressure for a period of time sufficient to crystallize the resin.

Glass fabric or glass roving, from a continuous supply roll thereof, can be treated or coated continuously with a hot melt of the polyester resin of this invention by methods such as knife-coating, roll coating, extrusion coating, nip drawing, and the like. Fast setting of the polyester resin will permit of immediate continuous takeup of the treated fabric or roving. The resin-treated material can be laminated or otherwise handled and subsequently molded under pressure and with the application of heat to provide a high-strength member. Resin-treated glass roving can be wound over a form, such as a mandrel, and heat treated continuously by a hot roller or the like to provide a high-strength member.

Intermediate products, sometimes referred to in the art as "prepregs" can be prepared from the resins of this invention. Thus, for example, glass fabric impregnated with the resin of this invention in its amorphous state can be stored for prolonged periods of time at room temperature conditions without any untoward effects. The "prepreg" can subsequently be molded by the application of heat and pressure into high strength, high temperature-resistant boat hulls, automobile body panels, and the like. Appropriate molding conditions result in the conversion of the polyester from the amorphous state to the crystalline state.

The resins can be employed as protective coatings for various substrates such as glass, metal, wood, paper, and the like. Known coating methods can be employed. Thus, the resin can be extrusion coated onto a steel sheet and the thus-coated sheet subsequently heat treated whereby the properties of the applied coating are improved substantially.

It is to be understood that the above description and examples are illustrative of this invention and not in limitation thereof.

What I claim and desire to protect by Letters Patent is:

1. A linear thermoplastic polyester resin having a specific viscosity of at least about 0.4 as measured at 25° C.

on a 1% solution of said resin in a 60:40 by weight mixture of phenol and tetrachloroethane, and made by the melt polymerization of reactants consisting essentially of
(1) acid material of which
    (a) about 25–40 mole percent thereof is selected from the group consisting of hexahydroterephthalic acid and lower dialkyl esters thereof, and
    (b) about 75–60 mole percent of which is selected from the group consisting of terephthalic acid and lower dialkyl esters thereof, and
(2) a glycol having the formula $HO(CH_2)_nOH$, wherein $n$ is a whole number of 2–10, said glycol being in excess of one mole per mole of said acid material.

2. A linear, thermoplastic polyester resin according to claim 1 wherein the (a) portion of said acid material consists essentially of dimethyl hexahydroterephthalate, the (b) portion of said acid material consists essentially of dimethyl terephthalate, and said glycol is ethylene glycol.

References Cited

UNITED STATES PATENTS

| | | | |
|---|---|---|---|
| 3,268,477 | 8/1966 | Mueller | 260—75 |
| 3,117,901 | 1/1964 | Chambers | 260—75 |

FOREIGN PATENTS

| | | |
|---|---|---|
| 588,833 | 6/1947 | Great Britain. |

WILLIAM H. SHORT, *Primary Examiner.*

R. T. LYON, *Assistant Examiner.*